United States Patent

Smith

[11] Patent Number: 5,908,204
[45] Date of Patent: Jun. 1, 1999

[54] STIFFENING SYSTEM FOR STRUCTURAL MEMBER OF MOTOR VEHICLE FRAME

[75] Inventor: Bradley W. Smith, Ogden, Utah

[73] Assignee: Morton International, Inc., Chicago, Ill.

[21] Appl. No.: 08/989,580

[22] Filed: Dec. 12, 1997

Related U.S. Application Data

[62] Division of application No. 08/598,910, Feb. 9, 1996, Pat. No. 5,727,815.

[51] Int. Cl.⁶ .............................. B60R 21/26; B62D 21/15
[52] U.S. Cl. .......................... 280/741; 280/731; 280/784
[58] Field of Search ........................... 180/274; 280/735, 280/731, 741, 743.1, 734, 784, 785; 296/188, 189

[56] References Cited

U.S. PATENT DOCUMENTS

| | | | |
|---|---|---|---|
| 3,656,791 | 4/1972 | Truesdell | 293/1 |
| 3,689,054 | 9/1972 | Gouirand | 267/68 |
| 3,708,194 | 1/1973 | Amit | 293/1 |
| 3,741,598 | 6/1973 | Novak et al. | 293/71 P |
| 4,176,858 | 12/1979 | Kornhauser | 280/734 |
| 4,225,168 | 9/1980 | Granig | 293/134 |
| 4,355,844 | 10/1982 | Muzzarelli | 296/205 |
| 4,411,462 | 10/1983 | Buehrig et al. | 293/132 |
| 4,451,518 | 5/1984 | Miura et al. | 428/137 |
| 4,518,183 | 5/1985 | Lee | 293/118 |
| 4,552,380 | 11/1985 | Stevens | 280/728 |
| 4,706,990 | 11/1987 | Stevens | 280/734 |
| 4,722,550 | 2/1988 | Imoka et al. | 280/727 |
| 5,042,859 | 8/1991 | Zhang et al. | 293/107 |
| 5,106,137 | 4/1992 | Curtis | 293/107 |
| 5,141,279 | 8/1992 | Weller | 296/146 D |
| 5,382,051 | 1/1995 | Glance | 280/751 |
| 5,406,889 | 4/1995 | Letendre et al. | 102/201 |
| 5,431,476 | 7/1995 | Torigaki | 296/188 |
| 5,845,937 | 12/1998 | Smith | 280/784 |

FOREIGN PATENT DOCUMENTS

| | | |
|---|---|---|
| 2449334 | 4/1976 | Germany . |
| 9314356 U | 5/1994 | Germany . |
| 19514191 | 9/1996 | Germany . |

*Primary Examiner*—Paul N. Dickson
*Attorney, Agent, or Firm*—Ohlandt, Greeley, Ruggiero & Perle, L.L.P.; George W. Rauchfuss, Jr.

[57] ABSTRACT

A collision- or rapid deceleration-initiated stiffening system for a structural member of a motor vehicle frame. The system includes a structural member that defines a hollow, substantially gas-tight interior. The system also includes an inflator for pressurizing the interior of the structural member to increase the stiffness and the axial or buckle strength of the structural member upon collision or rapid deceleration of the motor vehicle. The inflator may produce inflation gas for pressurizing the structural member from different sources including the burning of solid pyrotechnic gas generant or the release of a stored gas, for example. In addition, the inflator may be initiated by different initiators including an electrical initiator squib connected to a remote deceleration sensor or a depressible initiator plunger in alignment with a bumper strut, for example. The inflator also may be used to inflate an airbag cushion of an airbag module in addition to pressurizing the structural member.

3 Claims, 4 Drawing Sheets

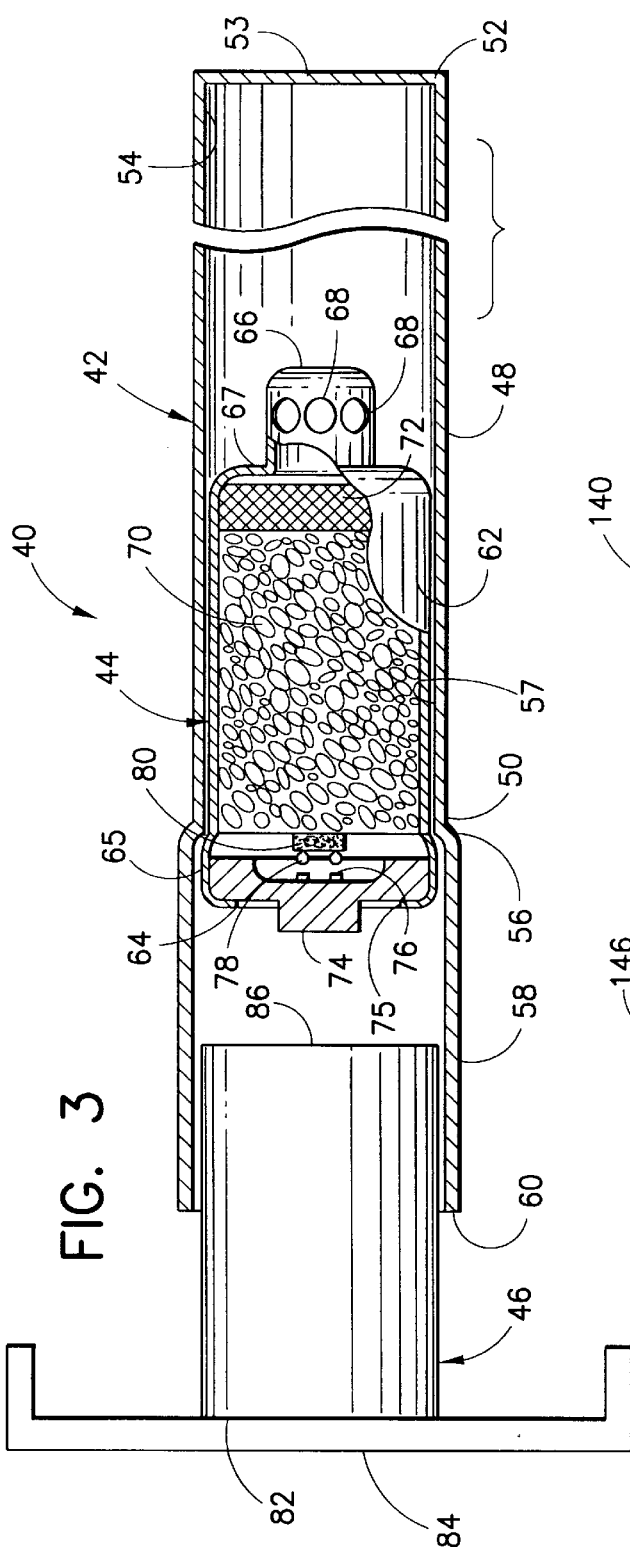

STIFFENING SYSTEM FOR STRUCTURAL MEMBER OF MOTOR VEHICLE FRAME

This Application is a Divisional Application of Application Ser. No. 08/598,910 filed on Feb. 9, 1996 now U.S. Pat. No. 5,727,815.

FIELD OF THE INVENTION

The present invention relates to a motor vehicle safety device and, more particularly, to a collision- or rapid deceleration-initiated stiffening system for a structural member of a motor vehicle frame.

BACKGROUND OF THE INVENTION

Decreasing the weight of motor vehicles to provide better fuel economy, and increasing the strength of motor vehicles to provide greater protection to occupants during a collision are both desirable goals. These goals, however, are often in conflict and compromises between decreasing weight and increasing strength are often made in the design of motor vehicles. The ultimate goal is to provide motor vehicles that are sufficiently strong to provide adequate protection for occupants in the event of a collision and are also sufficiently light in weight to maximize fuel economy.

A typical motor vehicle has a frame upon which body panels and engine and suspension components are mounted. The frame also supports the vehicle's bumpers and provides protection to vehicle occupants during a collision. The overall protection provided by the frame is dependent upon the rigidity and buckle strength of individual structural members that make up the frame. Many of the structural members, especially those upon which the vehicle's bumpers are mounted are tubular or have a non-circular hollow cross-section. The rigidity and buckle strength of the individual tubular or non-circular hollow structural members is normally dependent upon the sidewall thickness of the structural member. Increasing the sidewall thickness increases the strength of the structural member but also increases the weight of the structural member, while decreasing the sidewall thickness decreases the weight but also decreases the strength.

In summary, the frame of a motor vehicle comprises a large portion of the total weight of the motor vehicle and also comprises a large portion of the protection provided by the motor vehicle to vehicle occupants during collisions. Accordingly, there is a need for reducing the weight of the tubular or non-circular hollow structural members of the frame without substantially reducing the rigidity and buckle strength of the structural members. There is also a need for increasing the strength of the tubular or non-circular hollow structural members without substantially increasing the weight or sidewall thickness of the structural member.

SUMMARY OF THE INVENTION

An object, therefore, of the present invention is directed to a stiffening system that satisfies one or all of the above needs. In carrying out this invention, there is provided a collision- or rapid deceleration-initiated stiffening system for a structural member of a motor vehicle fame. The system includes a structural member for use as part of a frame of a motor vehicle, and the structural member defines a hollow, substantially gas-tight interior. The system further includes pressurizing means for introducing pressurized fluid into the interior of the structural member to pressurize the interior of the structural member to a predetermined level upon rapid deceleration or collision of the motor vehicle.

The pressurizing means comprises an inflator for producing sufficient inflation gas to pressurize the gas-tight interior of the structural member to the predetermined level upon initiation of the inflator. Initiating means for initiating the inflator is connected to or positioned with respect to triggering means for triggering the initiating means upon rapid deceleration or collision of the motor vehicle.

The inflator defines at least one gas exhaust port for releasing the inflation gas. According to one aspect of the present invention, a conduit connects the at least one gas exhaust port of the inflator with an opening defined by the structural member, so that the at least one gas exhaust port communicates with the gas-tight interior of the structural member. According to another aspect of the present invention, the inflator is positioned adjacent to or within an opening defined by the structural member, whereby the at least one gas exhaust port communicates through the opening with the gas-tight interior of the structural member.

Pressurizing the hollow, substantially gas-tight interior of an elongated structural member increases the stiffness and the axial or buckle strength of the structural member. The present invention, therefore, provides a system that increases the axial or buckle strength of a structural member of a frame of a motor vehicle without substantially increasing the weight of the structural member. In the alternative, the present invention allows the weight of the structural member to be reduced without a substantial reduction in axial or buckle strength.

The invention together with further objects, features, advantages and aspects thereof, will be more clearly understood from the following description taken in connection with the accompanying drawings.

BRIEF DESCRIPTION OF THE DRAWINGS

FIG. 3 is an elevational side view, partially in section, of another collision- or rapid deceleration-initiated stiffening system according to the present invention, for a structural member of a motor vehicle frame;

FIG. 4 is an elevational side view, partially in section, of an additional collision- or rapid deceleration-initiated stiffening system according to the present invention, for a structural member of a motor vehicle frame.

The same reference numerals refer to the same elements throughout the various figures.

DETAILED DESCRIPTION OF THE INVENTION

Figure 1:
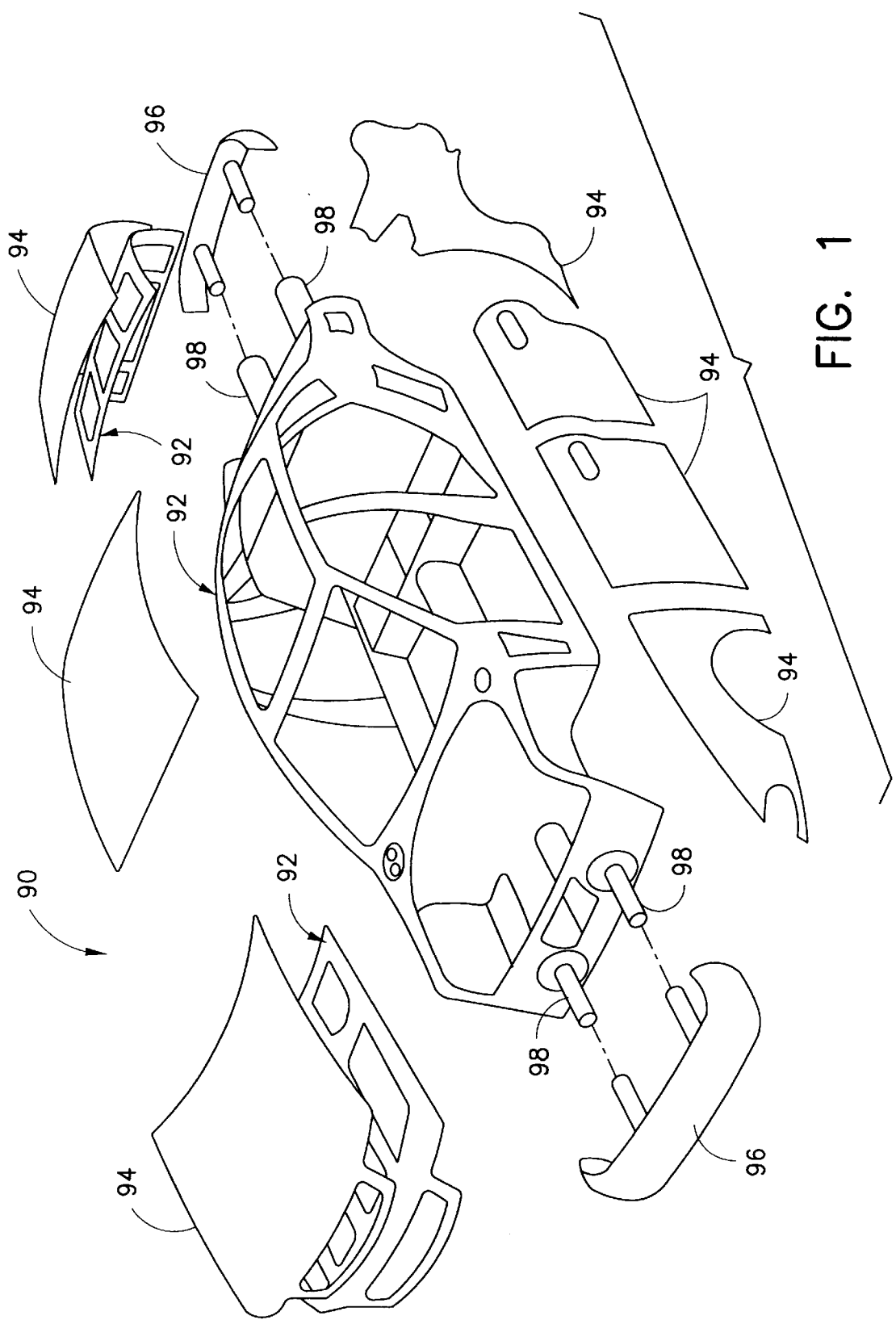
FIG. 1 is an exploded view of a frame of a typical automobile.

As shown in FIG. 1, a typical motor vehicle 90, in this case an automobile, has a frame 92 upon which body panels 94 and engine and suspension components (not shown) are mounted. The frame 92 also supports the vehicle's bumpers 96 and provides protection to vehicle occupants during a collision. The overall protection provided by the frame 92 is dependent upon the rigidity and buckle strength of individual structural members 98 that make up the frame.

Figure 2:
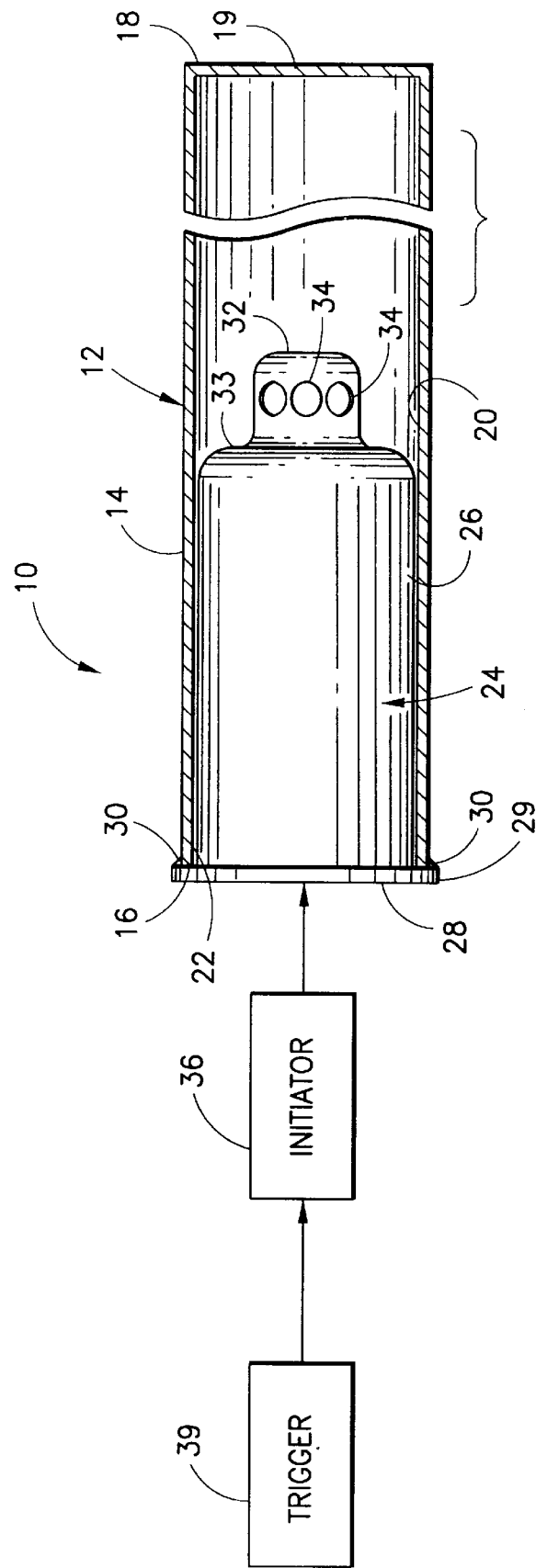
FIG. 2 is an elevational side view, partially in section, of a collision- or rapid deceleration-initiated stiffening system according to the present invention, for a structural member of a motor vehicle frame.

Referring to FIG. 2, the present invention is directed to a collision- or rapid deceleration-initiated stiffening system 10 for a structural member of a motor vehicle frame. The stiffening system 10 includes a structural member 12 for use as part of a frame of a motor vehicle. The structural member 12 is for supporting components of the motor vehicle, such as the vehicle's bumper for example, and includes an elongated, tubular sidewall 14 having an open end 16 and a closed end 18. As shown, the closed end 18 of the structural member 12 is closed by an endwall 19, but could be closed in another way such as by crimping the sidewall 14, for example. The sidewall 14 and endwall 19 partially define a hollow, substantially gas-tight interior 20 of the structural member 12, and the open end 16 defines an opening 22 that communicates with the gas-tight interior of the structural member.

The system 10 also includes pressurizing means for pressurizing the gas-tight interior 20 of the structural member 12 to a predetermined level upon rapid deceleration or collision of the motor vehicle. The pressurizing means comprises an inflator 24 that is similar to an airbag inflator of an airbag module normally located within the passenger compartment of a motor vehicle. The inflator 24 has a cylindrical inflator housing 26 extending through the opening 22 of the structural member 12 and received in the gas-tight interior. Preferably the cylindrical inflator housing 26 is tightly received by the tubular sidewall 14. A flange 29 extends radially outwardly from a first end 28 of the inflator housing 26 and butts against the open end 16 of the sidewall 14 in a substantially gas-tight manner. The inflator 24 is secured to the structural member 12 by suitable means such as by welds 30, for example, between the flange 29 and the open end 16 of the sidewall 14. A diffuser 32 extends from a second end 33 of the inflator housing 26 and defines a plurality of gas exhaust ports 34.

The inflator 24 is for providing sufficient inflation gas to pressurize the gas-tight interior 20 of the structural member 12 to the predetermined level upon initiation of the inflator. It is important to note that the inflator 24 could comprise any suitable type of inflator for providing inflation gas. For example, the inflator 24 could provide inflation gas from one or more of the following sources: the burning of a solid pyrotechnic material, the burning of a fluid fuel/oxidizer, the release of a stored gas, or the reaction of a monopropellant. Initiating means 36 for initiating the inflator 24 is connected to the inflator, and triggering means 39 for triggering the initiating means is connected to or positioned with respect to the initiating means.

The initiating means 36 and the triggering means 39 could comprise many different components and combinations of components. For example, the initiating means 36 could comprise an electrical initiating squib connected to triggering means 39 comprising a remote electronic collision or rapid deceleration sensor. Alternatively, the initiating means 36 could comprise a pyrotechnic transmission line connected to triggering means 39 comprising a remote mechanical collision or rapid deceleration sensor for igniting the pyrotechnic transmission line. An example of a remote mechanical collision or rapid deceleration sensor is shown and described in U.S. Pat. No. 4,706,990. Additionally, the initiating means 36 could comprise a fiber optic wire connected to triggering means 39 comprising a remote mechanical or electrical collision or rapid deceleration sensor having a laser source. An example of triggering means having a laser source is shown and described in U.S. Pat. No. 5,406,889.

Generally, upon collision or rapid deceleration of the motor vehicle, the triggering means 39 triggers the initiating means 36 which initiates the inflator 24. By initiate it is meant that the initiating means begins a process within the inflator 24 that leads to the production and release of inflation gas. Inflation gas is released through the gas exhaust ports 34 of the inflator 24 into the gas-tight interior 20 of the structural member 12 to rapidly pressurize the structural member, which increases the axial or buckle strength of the sidewall 14 of the structural member. The present invention, therefore, increases the axial or buckle strength of the structural member 12 of a frame of a motor vehicle without substantially increasing the weight of the structural member, and alternatively, allows the thickness of the sidewall 14 of the structural member to be decreased to reduce weight without substantially reducing the buckle strength of the sidewall.

It is important to note that many embodiments of the present invention are possible. For example, the structural member, which is normally elongated, does not have to be tubular but can have a non-circular cross-section, as long as the structural member has a substantially gas-tight interior. By substantially gas-tight, it is meant that the structural member may have miscellaneous holes or other openings as long as those openings do not allow a substantial amount of the inflation gas produced by the inflator to exit the structural member within the roughly 10 to 100 milliseconds that the inflator will take to pressurize the structural member. Also, as discussed above, different inflators can be used, different initiating means can be used and different triggering means can be used.

FIGS. 3 and 4 show two more specific embodiments of the present invention. FIG. 3 shows a collision- or rapid deceleration-initiated stiffening system 40, according to the present invention, for a structural member of a motor vehicle frame that includes a structural member 42, an inflator 44 and a bumper strut 46. The structural member 42 is for use as part of a frame of a motor vehicle and has an elongated, tubular sidewall 48 having an open end 50 and a closed end 52 closed by an endwall 53. The sidewall 48 and endwall 53 partially define a hollow, substantially gas-tight interior 54 of the structural member 42, and the open end 50 forms a shoulder 56 extending radially outwardly from the sidewall 48. The shoulder 56 defines an opening 57 of the structural member 42. A tubular sleeve 58 extends from the shoulder 56 away from and in axial alignment with the sidewall 48 and leads to a open sleeve end 60.

Pressurizing means comprises the inflator 44 which has a cylindrical inflator housing 62 extending through the opening 57 of the structural member 42 and received in the gas-tight interior 54. Preferably, the inflator housing 62 is secured in the structural member 42 by a tight fit between the inflator housing and the sidewall, but could also be secured by other suitable means such as welding or crimping, for example. A flange 65 extends radially outwardly from a first end 64 of the inflator housing 62 and butts against the shoulder 56 of the sidewall 48 in a substantially gas-tight manner. A diffuser 66 extends from a second end 67 of the inflator housing 62 and defines a plurality of gas exhaust ports 68, and the second end and diffuser are positioned within the gas-tight interior 54 of the structural member 42.

As shown, the inflator 44 contains a suitable pyrotechnic solid fuel gas generant 70 but could alternatively contain other sources of inflation gas such as a combination of gas generant and compressed gas, for example. The inflator 44 contains sufficient gas generant 70 to produce an amount of inflation gas to pressurize the gas-tight interior 54 of the structural member 42 to a predetermined level. A gas cooling and filtering assembly 72 is positioned between the gas generant 70 and the diffuser 66. Initiating means comprises a depressible initiator plunger 74 extending through an aperture 75 in the first end 64 of the inflator housing 62. The initiator plunger 74 has dense metal firing pins 76 that are axially aligned with percussion primers 78 attached to a suitable primary ignitor material 80 positioned to ignite the gas generant 70.

Triggering means comprises the bumper strut 46 which is cylindrical, but could be another shape, and has a first end 82 attached to a bumper attachment 84 connectable to a vehicle bumper (not shown). A second end 86 of the bumper strut 46 extends through the open sleeve end 60 of the structural member 42 and is received within the tubular sleeve 58 of the structural member. The outer diameter of the bumper strut 46 is essentially the same as the inner diameter of the sleeve 58 so that resistance means comprising a tight fit between the sleeve and the bumper strut prevents the bumper strut from sliding within the sleeve unless a threshold amount of force is applied to the first end 82 of the bumper strut. Normally, motor vehicle bumpers are designed to withstand a collision speed of up to 5 mph, for example, and then collapse into the vehicle frame. The bumper strut 46 is in a tight sliding relationship with the sleeve 58 so that the bumper strut cannot slide within the sleeve unless a threshold force equal to or greater than that created by the motor vehicle striking an object with the bumper at a speed of at least 5 mph is applied to the first end 82 of the bumper strut. Alternatively, the resistance means could comprise weak welds between the bumper strut 46 and the sleeve 58, or crimps in the sleeve around the bumper strut, for example.

During a collision that causes a threshold amount of force to be applied to the bumper, the bumper forces the bumper strut 46 into the sleeve 58 of the structural member 42 until the second end 86 of the bumper strut depresses the initiator plunger 74 of the inflator 44. As the initiator plunger 74 is depressed into the inflator 44, the firing pins 76 strike and set off the percussion primers 78 which ignite the primary ignitor 80 which in-turn ignites the gas generant 70. The ignited gas generant 70 rapidly produces inflation gas which is cooled and filtered through the gas cooling and filtering assembly 72 before exiting the diffuser 66 through the plurality of gas exhaust ports 68 to pressurize the interior 54 of the structural member 42. Upon depressing the plunger 74, the bumper strut 46 is stopped from further movement into the structural member 42 by the inflator flange 65 butting against the shoulder of the structural member. The inflator flange 65 prevents the inflator 44 and bumper strut 46 from being pushed further into the structural member 42, unless of course an excessively large force, caused by a high speed collision, is applied to the bumper.

FIG. 4 shows another collision- or rapid deceleration-initiated stiffening system 140, according to the present invention, for a structural member of a motor vehicle frame that includes a structural member 142, an inflator 144 and a mechanical deceleration sensor 146. The structural member 142 has an elongated, tubular sidewall 148 having an open end 150 and a closed end 152 closed by an endwall 153. The sidewall 148 and endwall 153 partially define a hollow, substantially gas-tight interior 154 of the structural member 142, and the open end 150 defines an opening 156 of the structural member.

Pressurizing means comprises the inflator 144 which has a cylindrical inflator housing 162 extending through the opening 157 of the structural member 142 and received in the gas-tight interior 154. Preferably, the cylindrical inflator housing 162 is tightly received by the tubular sidewall 148. The mechanical deceleration sensor 146 extends radially outwardly from a first end 164 of the inflator housing 162 and butts against the open end 150 of the sidewall 148 in a substantially gas-tight manner. A diffuser 166 extends from a second end 167 of the inflator housing 162 and defines a plurality of gas exhaust ports 168, and the second end and diffuser are positioned within the gas-tight interior 154 of the structural member 142.

The inflator 144 is for providing sufficient inflation gas to pressurize the gas-tight interior 154 of the structural member 142 to the predetermined level upon initiation of the inflator. As shown, the inflator 144 is similar to the inflator 44 of FIG. 3 and contains a suitable pyrotechnic solid fuel gas generant 170 but could alternatively contain other inflation gas producing means. Initiating means comprises a percussion primer 172 attached to a suitable primary ignitor material 184 positioned to initiate the inflator, or more specifically ignite the gas generant 170.

Triggering means comprises the mechanical deceleration sensor 146 which includes an inertial mass 176 carrying a dense metal firing pin 178 that is axially aligned with the percussion primer 178. The inertial mass 176 is connected to a thin over-center concave steel diaphragm 180 that acts to restrain the inertial mass until a deceleration level is reached that is high enough to produce an inertial force sufficient to buckle the diaphragm. The inertial mass 176 is then free to be propelled towards the inflator 144 so that the firing pin 178 will strike and ignite the percussion primer 172. The diaphragm 180 and inertial mass 176 are contained in a sensor casing 182 that is secured to the first end 164 of the inflator housing 162 by suitable means such as welding, for example. A similar mechanical deceleration sensor is shown and described in U.S. Pat. No. 4,706,990.

During a rapid deceleration caused by a collision, the firing pin 178 strikes and sets off the percussion primer 172 which ignites the primary ignitor 174 which in-turn ignites the gas generant 170. The ignited gas generant 170 rapidly produces inflation gas which exits the diffuser 166 through the plurality of gas exhaust ports 168 to pressurize the gas-tight interior 154 of the structural member 142.

Figure 5:
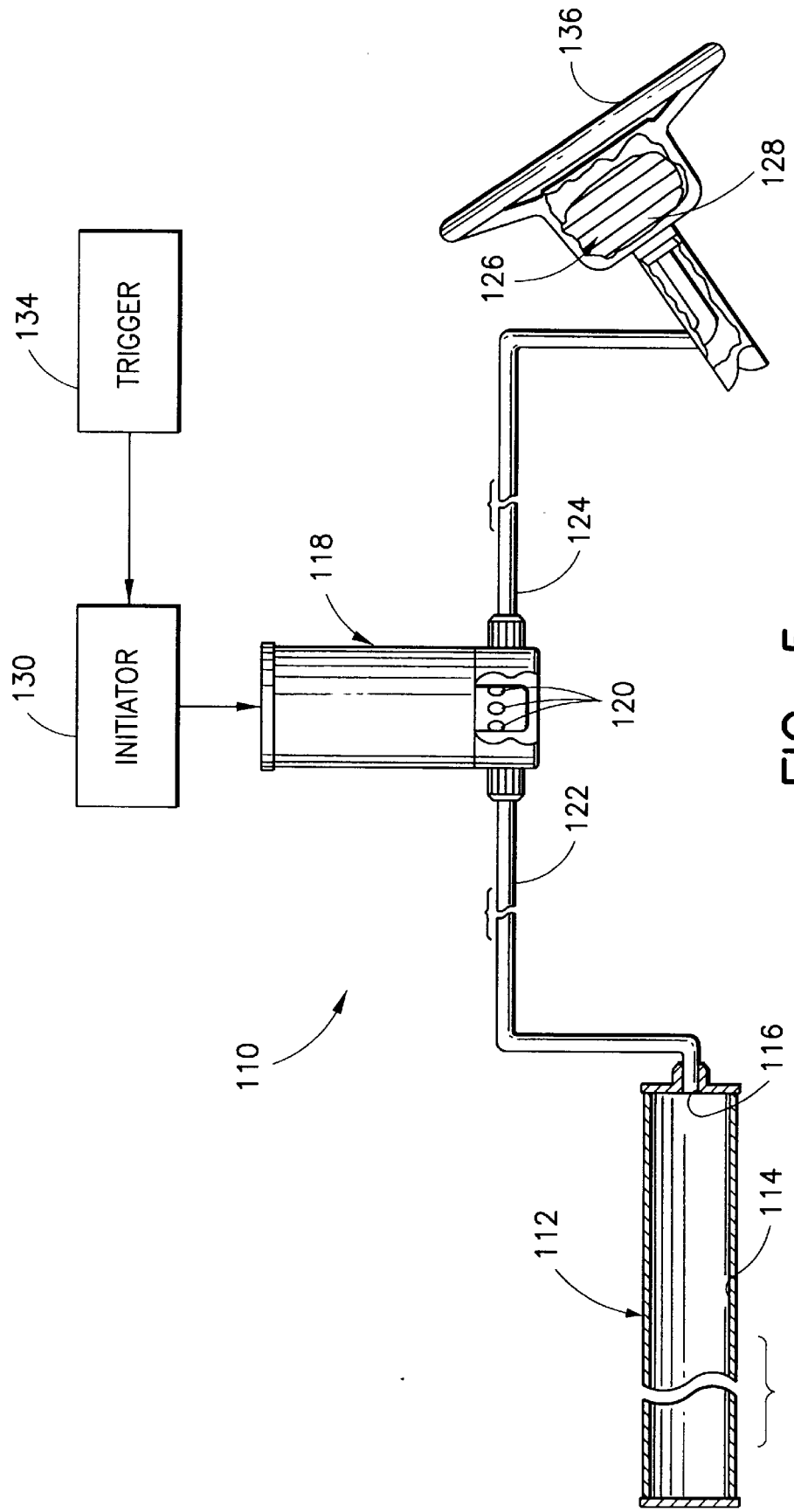
FIG. 5 is an elevational side view, partially in section, of a further collision- or rapid deceleration-initiated stiffening system according to the present invention, for a structural member of a motor vehicle frame.

Referring to FIG. 5, an additional collision- or rapid deceleration-initiated stiffening system 110, according to the present invention, for a structural member of a motor vehicle frame is shown. The stiffening system 110 includes a structural member 112 for use as part of a frame of a motor vehicle. The structural member generally defines a hollow, substantially gas-tight interior 114, and an opening 116 communicating with the gas-tight interior. Pressurizing means comprises a remote inflator 118 for introducing pressurized fluid or inflation gas into the gas-tight interior 114 of the structural member 112 to pressurize the interior of the structural member to a predetermined level upon rapid deceleration or collision of the motor vehicle. The inflator 118 provides inflation gas from one or more of the following sources: the burning of a pyrotechnic solid fuel, the burning of a fluid fuel/oxidizer, the release of a stored gas or the reaction of a monopropellant.

The inflator 118 generally defines a plurality of gas exhaust ports 120, and a first conduit 122 connects the plurality of gas exhaust ports with the opening 116 defined by the structural member 112, so that the plurality of gas exhaust ports communicate with the gas-tight interior 114 of the structural member. As shown, a second conduit 124 connects the plurality of gas exhaust ports 120 with an airbag cushion 128 of a passenger compartment airbag module 126. The inflator 118 provides sufficient inflation gas to pressurize the gas-tight interior 114 of the structural member 112 to the predetermined level and simultaneously inflate the airbag cushion 128. Airbag modules are known to those skilled in the art and therefore not described in detail.

Initiating means 130 for initiating the inflator 118 is connected to triggering means 134 for triggering the initiator means upon rapid deceleration or collision of the motor vehicle. As discussed above, the initiating means 130 and the triggering means 134 could comprise many different components and combinations of those components. For example, the initiating means 130 could comprise an electrical initiating squib connected to triggering means 134 comprising a remote electronic collision or rapid deceleration sensor. Alternatively, the initiating means 130 could comprise a depressible initiator plunger extending from the inflator, and the triggering means 134 could comprise a bumper strut in axial alignment with the initiator plunger, with resistance means preventing the bumper strut from depressing the initiator plunger until a threshold force is applied to the bumper strut. Many variations are possible.

The inflator 118 could alternatively be located within the airbag module 126 and connected to the structural member 112 by the first conduit 122, or the inflator could be directly attached to the structural member and connected by the second conduit 124 to the airbag module. As shown, the airbag module 126 is a driver side airbag module contained in a steering wheel 136, but could be a passenger side airbag module or a side impact airbag module. In addition, the inflator 118 could be connected to more than one structural member and more than one airbag inflator. Again, many variations are possible.

It has been calculated that pressurizing the interior of the structural member to roughly 200 psi to 300 psi can increase the rigidity and buckle strength of the structural member by roughly 20% to 30%. The additional strength provided by the inflator allows either: the axial or buckle strength of the structural member to be increased without substantially increasing the weight of the structural member; or decreasing the weight of the structural member by decreasing the thickness of the sidewall of the structural member without substantially decreasing the axial or buckle strength of the structural member.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. A collision- or rapid deceleration-initiated system for increasing rigidity and axial buckle strength of an elongated structural frame member of a motor vehicle frame, the system comprising:

at least one elongated structural frame member of a motor vehicle, the structural member containing a hollow, substantially gas-tight interior;

at least one airbag module having an inflatable airbag cushion;

pressurizing means for introducing pressurized fluid into the gas-tight interior of the at least one structural frame member to pressurize the gas-tight interior of the structural frame member to a predetermined level whereby rigidity and axial buckle strength of the elongated structural frame member is increased and for essentially simultaneously introducing pressurized fluid into the inflatable airbag cushion of the at least one airbag module to inflate the inflatable airbag cushion upon rapid deceleration or collision of the motor vehicle.

2. The stiffening system of claim 1 wherein the pressurizing means comprises:

an inflator in fluid communication with the gas-tight interior of the at least one structural frame member and the inflatable airbag cushion of the at least one airbag module for providing pressurized fluid in the form of inflation gas upon initiation of the inflator;

initiating means for initiating the inflator; and triggering means connected to or positioned with respect to the initiating means for triggering the initiating means upon rapid deceleration or collision of the motor vehicle.

3. The stiffening system of claim 2 wherein:

the at least one structural frame member defines an opening communicating with the gas-tight interior;

the inflator defines at least one gas exhaust port for releasing the inflation gas;

a conduit connecting the at least one gas exhaust port of the inflator with the opening defined by the at least one structural frame member, whereby the at least one gas exhaust port communicates with the gas-tight interior of the at least one structural frame member establishing the fluid communication between the inflator and the gas-tight interior of the at least one structural frame member; and a conduit connecting the at least one gas exhaust port of the inflator with the inflatable airbag cushion of the at least one airbag module, whereby the at least one gas exhaust port communicates with the inflatable airbag cushion of the at least one airbag module establishing the fluid communication between the inflator and the inflatable airbag cushion of the at least one airbag module.

* * * * *